United States Patent
Kurabayashi

(10) Patent No.: US 10,653,965 B2
(45) Date of Patent: May 19, 2020

(54) INFORMATION PROCESSING SYSTEM, INFORMATION PROCESSING METHOD, PROGRAM, SERVER, AND INFORMATION PROCESSING TERMINAL

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 16/046,701

(22) Filed: Jul. 26, 2018

(65) Prior Publication Data

US 2019/0201793 A1   Jul. 4, 2019

Related U.S. Application Data

(63) Continuation of application No. PCT/JP2016/083784, filed on Nov. 15, 2016.

(30) Foreign Application Priority Data

Jan. 29, 2016   (JP) ................. 2016-015942

(51) Int. Cl.
*A63F 13/798* (2014.01)
*A63F 13/25* (2014.01)
(Continued)

(52) U.S. Cl.
CPC ............ *A63F 13/798* (2014.09); *A63F 13/25* (2014.09); *A63F 13/497* (2014.09);
(Continued)

(58) Field of Classification Search
CPC ...... A63F 13/798; A63F 13/25; A63F 13/497; A63F 2300/308; A63F 2300/558; A63F 2300/634
See application file for complete search history.

(56) References Cited

U.S. PATENT DOCUMENTS

2012/0221514 A1*   8/2012   Knight .................... G06F 16/48
                                                                              707/610
2013/0130794 A1    5/2013   Oshima et al.
(Continued)

FOREIGN PATENT DOCUMENTS

JP   2003-320170 A   11/2003
JP   2006-192142 A    7/2006
(Continued)

OTHER PUBLICATIONS

International Search Report issued in PCT/JP2016/083784, dated Feb. 14, 2017 (2 pages).
(Continued)

*Primary Examiner* — Werner G Garner
(74) *Attorney, Agent, or Firm* — Osha Liang LLP

(57) ABSTRACT

A difference calculating unit calculates the difference in evaluation quantity for a predetermined ranking index between a player of interest and another player at a higher rank than the player of interest according to the predetermined ranking index. A recording-recommendation presenting unit recommends the player of interest to create and upload a play-image for ranking information in the case where the difference has become less than or equal to a certain value.

8 Claims, 8 Drawing Sheets

(51) Int. Cl.
  *A63F 13/497*  (2014.01)
  *G06F 3/0484*  (2013.01)
(52) U.S. Cl.
  CPC ... *A63F 2300/308* (2013.01); *A63F 2300/558* (2013.01); *A63F 2300/634* (2013.01)

(56) References Cited

U.S. PATENT DOCUMENTS

| | | |
|---|---|---|
| 2014/0094302 A1 | 4/2014 | Wilkiewicz et al. |
| 2014/0228112 A1 | 8/2014 | Laakkonen et al. |
| 2014/0364206 A1 | 12/2014 | Shiraiwa et al. |
| 2015/0321097 A1 | 11/2015 | Wilkiewicz et al. |
| 2017/0007929 A1* | 1/2017 | Fukuda ................ A63F 13/497 |

FOREIGN PATENT DOCUMENTS

| | | |
|---|---|---|
| JP | 2007-244651 A | 9/2007 |
| JP | 2010-061624 A | 3/2010 |
| JP | 2012-038042 A | 2/2012 |
| JP | 2015-013103 A | 1/2015 |

OTHER PUBLICATIONS

Toby Sealey; Google Play Games is latest way of uploading gameplay straight to YouTube, BBC newsbeat [online], BBC; Oct. 30, 2015; URL: http://www.bbc.co.uk/newsbeat/article/34666192/google-play-games-is-latest-way-of-uploading-gameplay-straight-to-youtube (9 pages).

* cited by examiner

FIG. 6

```
Log1 = {event_type: battleAttack,
        timestamp: 2015/02/02 21:36:59:23,
        contents: {
            character: PLAYER CHARACTER 1,
            characterAttribute: WATER ATTRIBUTE,
            targetEnemy: ENEMY MONSTER 2,
            damage: 2100
 }}
```

INFORMATION PROCESSING SYSTEM, INFORMATION PROCESSING METHOD, PROGRAM, SERVER, AND INFORMATION PROCESSING TERMINAL

TECHNICAL FIELD

The present invention relates to information processing systems, information processing methods, programs, servers, and information processing terminals.

BACKGROUND ART

In social network games, rankings of competing players (e.g., see Patent Literature 1) are an important factor that significantly contributes to the fun of the games.

Meanwhile, recently, in order to share game experience among players on terminals such as smartphones, a large amount of video data created by recording game screens during play has been uploaded on the Internet (e.g., see Patent Literatures 2 and 3). An environment for this purpose is being established, and many development tools for recording such video data are being provided. It is predicted that many games incorporating toolkits that support creation of play-videos will appear in the future.

Generally, video data generated by recording game screens during play are often called "play-videos."

In addition to such video data, there is also another type of video data, which shows the proceedings of a game with a player himself or herself included in the captured video. Generally, such video data is called "Let's Play".

Hereinafter, however, these types of video data, including "Let's Play," will be collectively referred to as "play-videos."

That is, in this specification, "play-videos" are a broad concept meaning images representing the proceedings of a predetermined game.

CITATION LIST

Patent Literature

{PTL 1}
Japanese Unexamined Patent Application, Publication No. 2006-192142
{PTL 2}
Specification of the United States Patent Application, Publication No. 2014/0094302
{PTL 3}
Specification of the United States Patent Application, Publication No. 2014/0228112

SUMMARY OF INVENTION

Technical Problem

In existing social network games, however, only a small number of heavy players enjoying rankings, and ordinary casual players are not paying much interest to rankings. Motivating a large number of casual players to view rankings not only enhances the motivation of players placed in the rankings but is also important for increasing the number of players who newly wish to participate in the rankings.

As a factor for motivating players to participate in games on a long-term basis, there is interest in "play-videos", described above. There exist various kinds of SDKs (Software Development Kits) as development tools for capturing play-videos of games that run on smartphones. In games that adopt SDKs, since a function for recording a play-video is built into the games, it becomes possible to create play-videos seamlessly from within the games without having to use special external software or peripheral devices.

If it were possible to associate such play-videos with rankings, it would be possible to realize a function for motivating casual players to view rankings.

With existing technologies, however, ranking systems and play-video systems exist independently of each other, and a method for coordinating these systems has not been established.

Thus, the inventors are aiming to establish a technology for coordinating a ranking system and a play-video system with each other.

Furthermore, in order to make such a technology more widespread, it is desired to realize a technology for encouraging players placed in rankings to capture play-videos that will draw the interest of casual players.

Distribution methods in existing technologies can be broadly classified into methods in which game plays are directly distributed live and methods in which recording is performed in advance and capturing and viewing of play-videos are performed asynchronously.

Furthermore, the manners of viewing play-videos can be classified into two types: namely, content-appreciating media, which are popular mainly owing to their commentaries and talks by commentators, and spectatorship media, in which game plays themselves are enjoyed.

In the case of content-appreciating media data, since sophisticated editing techniques, talking ability, and presentation ability are required, there is a tendency that only specific commentators and content creators become popular.

In existing ordinary video sharing websites, there is a strong tendency that play-videos that are more popular are placed at higher ranks. Most popular play-videos are those created by heavy players. Therefore, there is only a low possibility that play-videos created by casual players are viewed by other casual players.

Furthermore, live broadcasting is generally assumed for large-scale events or finals or other high-ranking matches of tournaments and is difficult to employ daily in social network games.

As described above, the existing technologies lack a mechanism for presenting players placed at high ranks in social network games with suitable timings for creating and uploading play-videos. Thus, with the existing technologies, it is not possible to coordinate play-videos with rankings in social network games, which are updated daily.

The present invention has been made in view of the situation described above, and it is an object thereof to establish a technology for recommending a suitable timing for creating or uploading a play-video to a player in a system in which a ranking system and a play-video system are coordinated with each other.

Solution to Problem

In order to achieve the above object, an information processing system according to an aspect of the present invention is:

an information processing system including a server that manages the administration of a predetermined game and a plurality of terminals individually operated by a plurality of players participating in the game, the server comprising:
a ranking means for calculating evaluation quantities for a predetermined ranking index individually for the plurality of players on the basis of the results of execution of the game and determining individual ranks based on the ranking index on the basis of the evaluation quantities; and a ranking-information presenting means for presenting the plurality of terminals with ranking information showing the rank based on the ranking index and a play-image representing the proceedings of the game in association with each other for at least one of the plurality of players, and the server or the terminal of a player of interest who is to receive interest as a target of processing among the plurality of players comprising:

a difference calculating means for calculating the difference in the evaluation quantities between the player of interest and another player at a higher rank than the player of interest according to the ranking index; and a recommending means for recommending the player of interest to create and upload a play-image for the ranking information in the case where the difference has become less than or equal to a certain value.

Advantageous Effects of Invention

The present invention makes it possible to establish a technology for recommending a suitable timing for creating or uploading a play-video to a player in a system in which a ranking system and a play-video system are coordinated with each other.

BRIEF DESCRIPTION OF DRAWINGS

FIG. 6 is a diagram showing an example of an ordinary log database structure, i.e., a log structure.

DESCRIPTION OF EMBODIMENTS

An embodiment of the present invention will be described below with reference to the drawings.

It is to be understood that what are simply referred to as "images" hereinafter should be construed to include both "moving images" and "still images."

Furthermore, "moving images" should be construed to include images that are displayed individually through the following first processing to third processing.

First processing refers to processing for displaying a series of still images, while continuously switching among them as time passes, for individual actions of objects (e.g., game characters) in planar images (2D images). Specifically, two-dimensional animation, i.e., processing similar to what is called book flipping, is an example of first processing.

Second processing refers to processing for presetting motions corresponding to individual actions of objects (e.g., game characters) in stereoscopic images (images based on 3D models) and displaying the objects while changing the motions as time passes. Specifically, three-dimensional animation is an example of second processing.

Third processing refers to processing for preparing videos (i.e., moving images) corresponding to individual actions of objects (e.g., game characters) and rendering the videos as time passes.

Figure 1:
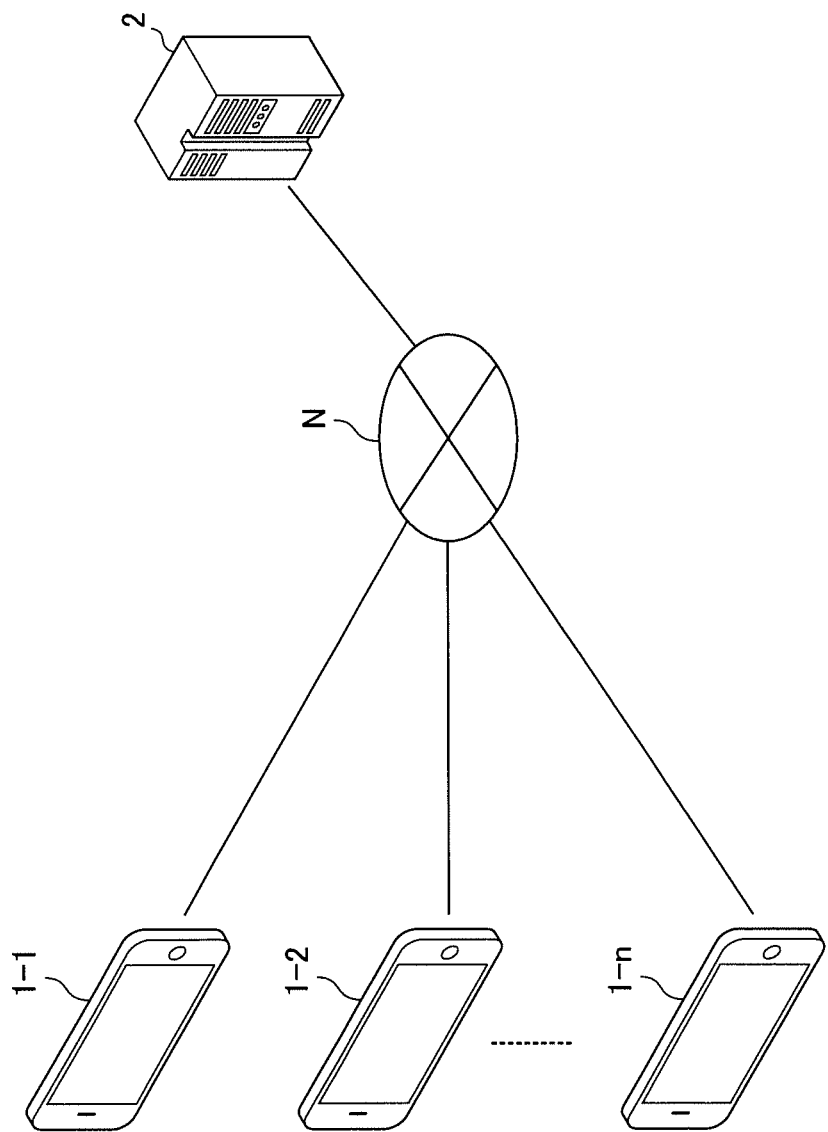
FIG. 1 is a block diagram showing the configuration of an information processing system according to an embodiment of the present invention.

FIG. 1 shows the configuration of an information processing system according to an embodiment of the present invention.

The information processing system shown in FIG. 1 is a system including player terminals 1-1 to 1-$n$ individually used by n players (n is an arbitrary integer greater than or equal to 1) and also including a server 2. The individual player terminals 1-1 to 1-$n$ and the server 2 are connected to each other via a predetermined network N, such as the Internet.

The server 2 provides the individual player terminals 1-1 to 1-$n$ with a game execution environment to provide various services relating to a game that is executed at the individual player terminals 1-1 to 1-$n$. As one of those services, in this embodiment, a service for a ranking function using various ranking indices is adopted.

Hereinafter, in the case where there is no need for distinction among the individual player terminals 1-1 to 1-$n$, these will be referred to collectively as "player terminals 1".

Figure 2:
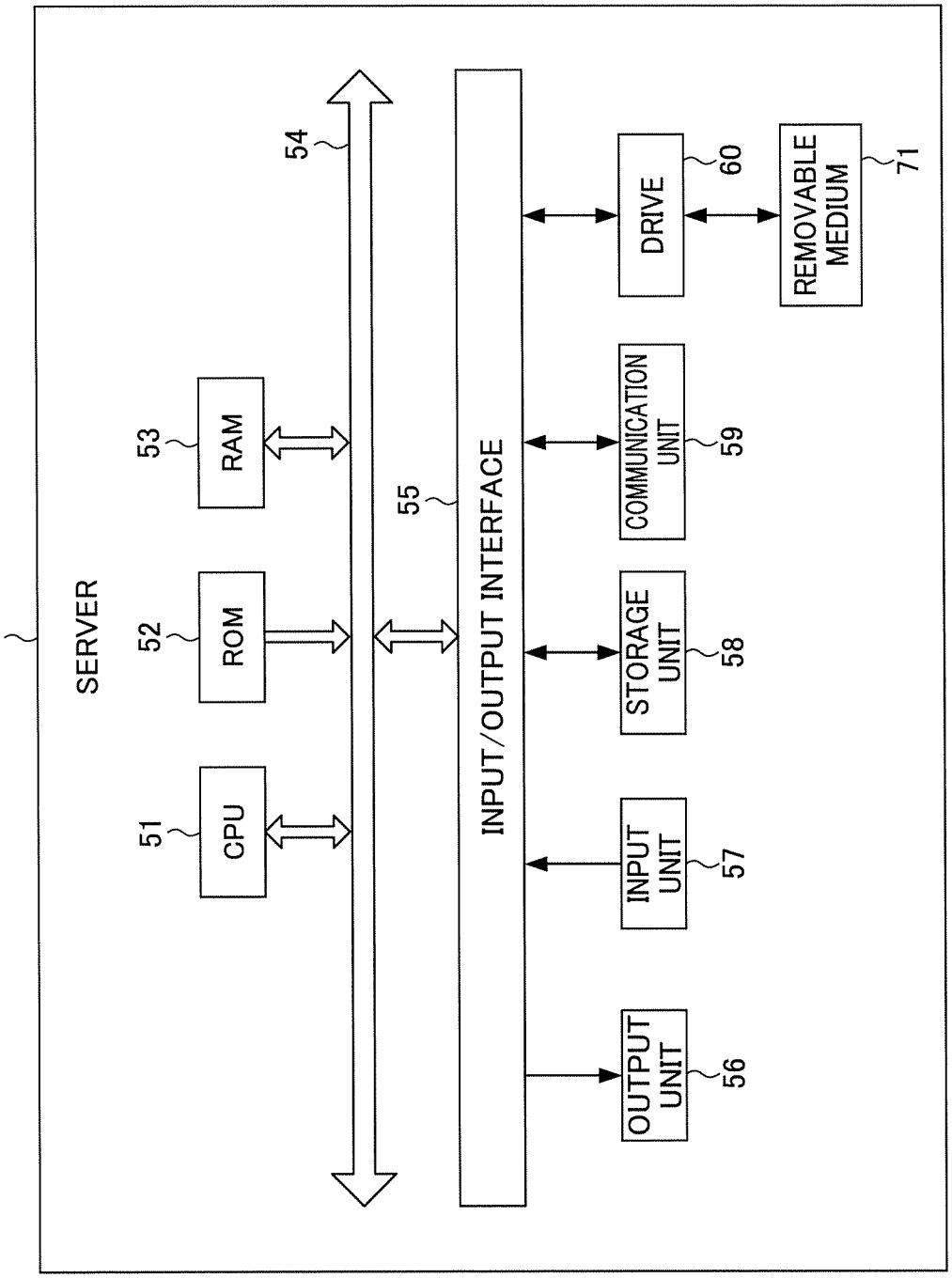
FIG. 2 is a block diagram showing, in the information processing system in FIG. 1, the hardware configuration of a server as an embodiment according to the present invention.

FIG. 2 is a block diagram showing, in the information processing system in FIG. 1, the hardware configuration of the server 2 according to an embodiment of the present invention.

The server 2 includes a CPU (Central Processing Unit) 51, a ROM (Read Only Memory) 52, a RAM (Random Access Memory) 53, a bus 54, an input/output interface 55, an output unit 56, an input unit 57, a storage unit 58, a communication unit 59, and a drive 60.

The CPU 51 executes various kinds of processing according to programs recorded in the ROM 52 or programs loaded from the storage unit 58 into the RAM 53.

The RAM 53 also stores, as appropriate, data, etc. that are needed when the CPU 51 executes various kinds of processing.

The CPU 51, the ROM 52, and the RAM 53 are connected to each other via the bus 54. The input/output interface 55 is also connected to the bus 54. The output unit 56, the input unit 57, the storage unit 58, the communication unit 59, and the drive 60 are connected to the input/output interface 55.

The output unit 56 is implemented by a display, a speaker, etc. and outputs various kinds of information in the form of images and audio.

The input unit 57 is implemented by a keyboard, a mouse, etc. and allows input of various kinds of information.

The storage unit 58 is implemented by a hard disk, a DRAM (Dynamic Random Access Memory), or the like and stores various kinds of data.

The communication unit 59 controls communications carried out with other devices (the player terminals 1 in the example in FIG. 1) via the network N, including the Internet.

The drive 60 is provided as needed. A removable medium 71 implemented by a magnetic disk, an optical disk, a magneto-optical disk, a semiconductor memory, or the like is loaded in the drive 60 as appropriate. A program read from the removable medium 71 by the drive 60 is installed in the storage unit 58 as needed. The removable medium 71 can also store various kinds of data stored in the storage unit 58, similarly to the storage unit 58.

Although not shown, in the information processing system in FIG. 1, the player terminal 1 according to an embodiment of the present invention also has the hardware configuration shown in FIG. 2.

Through cooperation between the various kinds of hardware and various kinds of software on the server 2 side, shown in FIG. 2, it becomes possible to manage and assist game execution at the player terminals 1.

The game involved in this embodiment is a social network game in which a plurality of players participate, such as a multi-battle.

In that game, a play-video recording/viewing function and a ranking function are provided.

That is, the information processing system according to this embodiment realizes a system in which a ranking system and a play-video system are coordinated with each other.

As a prerequisite for realizing such a system, however, it is necessary that players who have achieved a rank have uploaded play-videos.

For this purpose, it is necessary to give incentives or motivations to the players who have achieved a rank to upload play-videos at timings before or after they have achieved a rank.

Thus, in the information processing system according to this embodiment, in which a ranking system and a play-video system are coordinated with each other, the server 2, etc. recommends suitable timings for creating or uploading play-videos to players.

Specifically, in the system in which the ranking system and the play-video system are coordinated with each other, the main kind of suitable timings for creating or uploading play-videos are timings at which players newly achieve a rank or timings at which the ranks of players who have already achieved a rank go up.

Thus, the server 2, etc. in this embodiment monitors players whose ranks may change in a ranking based on a predetermined ranking index and recommends a player to create or upload a play-video when the possibility of a change in the rank of that player has become high.

Note that, even if play-videos are created at the player terminals 1, the system in which the ranking system and the play-video system are coordinated with each other does not function properly if those play-videos are not uploaded to the server 2, etc. Thus, even if recommendation by way of a message, etc. is intended to prompt creation or recording of a play-video, the final goal is uploading. Accordingly, what is hereinafter referred to as "recommendation for uploading a play-video" includes such recommendation by way of a message, etc.

Here, in this embodiment, the server 2, etc. calculates evaluation quantities relating to a predetermined ranking index individually for a plurality of players on the basis of the results of game execution and determines the individual ranks based on the ranking index on the basis of the evaluation quantities.

Here, a player who is to receive interest as a target of processing will be referred to as a "player of interest". In this case, whether or not there is a possibility that the rank of the player of interest moves up can be determined on the basis of the difference in evaluation quantity between the player of interest and another player placed at a higher rank according to a ranking index. This is because the possibility of moving up becomes higher as the difference in evaluation quantity becomes smaller whereas the possibility of moving up becomes lower as the difference in evaluation quantity become greater.

Thus, in this embodiment, in the case where the difference in evaluation quantity has become less than or equal to a certain value, the server 2, etc. determines that the possibility that the rank of the player of interest moves up has become high and recommends the player of interest to upload a play-video.

A series of processing that is executed before recommending a player of interest to upload a play-video will further be described below with reference to a specific example in FIG. 3.

Figure 3:
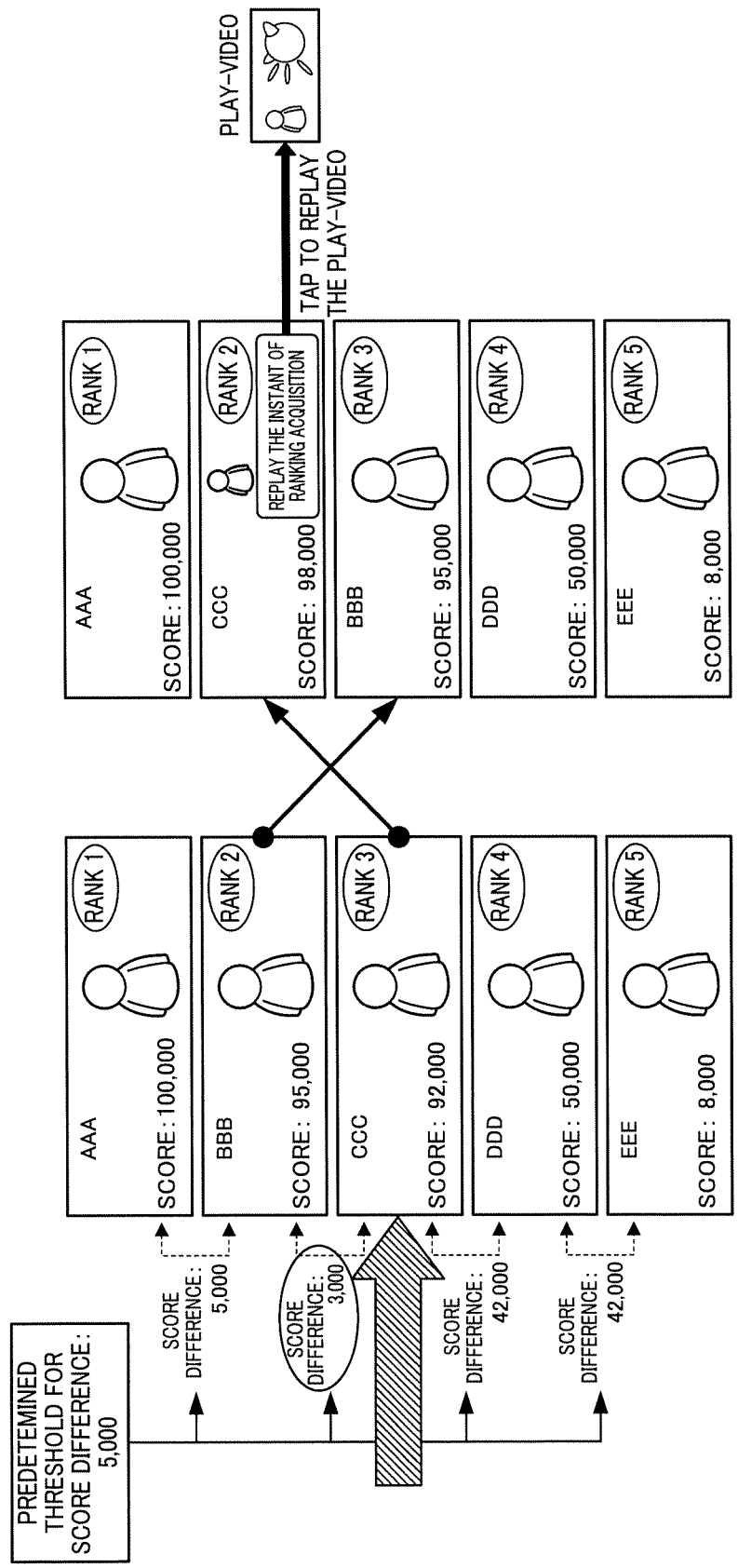
FIG. 3 is an illustration showing a specific example for explaining the detection of players who are recommended to capture play-videos and the association between a ranking and play-videos in the information processing system in FIG. 1.

FIG. 3 is an illustration showing a specific example for explaining how a player who is recommended to upload a play-video is detected and how play-videos are associated with a ranking in this embodiment of the information processing.

FIG. 3 shows an example of the result of ranking based on a predetermined ranking index. Specifically, in the example in FIG. 3, "scores" are adopted as evaluation quantities for the predetermined ranking index, the individual ranks based on the ranking index are determined in descending order of the scores, and the ranks are displayed as the results of ranking.

More specifically, players in the top five ranks are displayed in a ranking page.

Here, in the left example in FIG. 3, the score difference between AAA at rank 1 and BBB at rank 2 is 5,000. The score difference between BBB at rank 2 and CCC at rank 3 is 3,000. The score difference between CCC at rank 3 and DDD at rank 4 is 45,000. The score difference between DDD at rank 4 and EEE at rank 5 is 42,000.

Of these score differences, the score difference between BBB at rank 2 and CCC at rank 3, which is 3,000, is less than the predetermined threshold, which is 5,000.

That is, in the case where the player of interest is BBB, DDD, or EEE, since the score difference relative to the higher-ranking player is greater than or equal to the threshold, which is 5,000, the server 2, etc. determines that the possibility that the rank of the player of interest will go up is not so high.

Meanwhile, in the case where the player of interest is CCC, since the score difference relative to the higher-ranking player is less than the threshold, which is 5,000, the server 2, etc. determines that the possibility that the rank of the player of interest will go up has become high and thus recommends the player terminal 1 of CCC to upload a play-video.

That is, fluctuations in the ranking of a player are events of interest for that player himself or herself and also for other players competing with that player in the ranking. Thus, it is expected that play-videos captured in situations involving ranking fluctuations will be widely viewed by a large number of players participating in the game.

Thus, by recommending players to upload play-videos when their possibilities of achieving a rank have become high, as described above, it is possible to give incentives or motivations to the players to upload play-videos.

Then, the server 2, etc. associates the play-videos uploaded as described above with a ranking list.

This makes it possible for other ordinary players to readily view play-videos showing how the players in the ranking list played the game when they raised their rankings. That is, since play-videos are associated with a ranking, the server 2, etc. can distribute play-videos showing superior plays of high-ranking players in the ranking.

For example, in the example in FIG. 3, a play-video captured in a situation where CCC surpassed BBB in score and moved up from rank 3 to rank 2 is uploaded, and the play-video is associated with the field (display field) of CCC at rank 2 in the ranking list, as shown on the right side in the figure.

Figure 4:
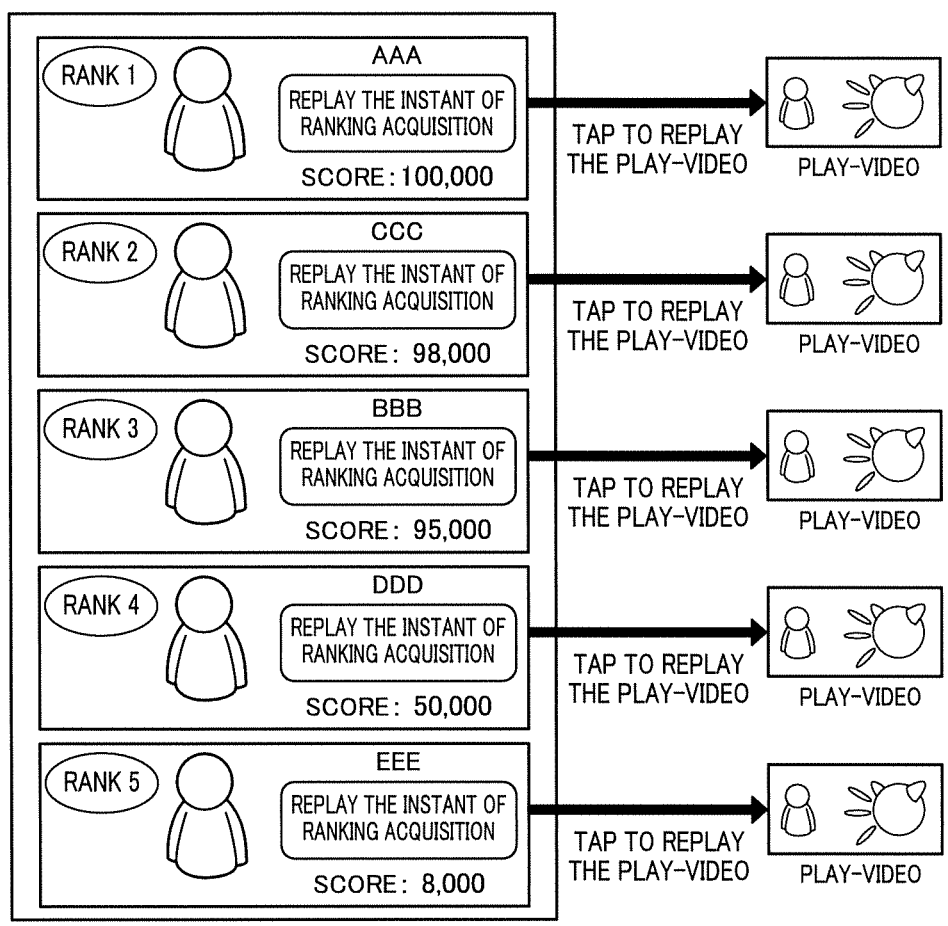
FIG. 4 is an illustration showing an example of a ranking page displayed at a player terminal on the basis of the results in the specific example in FIG. 3.

FIG. 4 is an illustration showing an example of a ranking page displayed on a player terminal on the basis of the results in the specific example in FIG. 3.

At the player terminal 1 of each player, it is possible to display a ranking page including the players placed at the top five ranks, as shown in the frames on the left side of FIG. 4. Furthermore, a software button "Replay the instant of ranking acquisition", etc. is displayed in the individual display fields for the players placed at the top five ranks. When the software button is pressed (tapped), the play-video captured when the relevant high-ranking player acquired the rank is replayed.

For example, let's suppose that the software button "Replay the instant of ranking acquisition" displayed in the display field for CCC at rank 2 has been pressed (tapped). In this case, as described above and as shown on the right side of FIG. 3, the play-video captured in the situation where CCC surpassed BBB in score and moved up from rank 3 to rank 2 is replayed.

Here, for example, for casual players at low ranks, viewing play-videos of players at high ranks will assist or otherwise support proceeding with the game. In this manner, casual players are motivated to view the ranking page through play-videos, which serves to increase the number of spectators of the ranking.

Furthermore, players who have achieved a rank can view play-videos as memories of their rank achievement. That is, it is possible to prompt players who have achieved a rank to upload play-videos naturally as chances for creating memories.

To summarize what has been described above, by applying the information processing system according to this embodiment, it becomes possible to detect a highlight scene for a player, namely, ranking acquisition, in advance through a change in the difference in evaluation quantity for a predetermined ranking index. Furthermore, it becomes possible to recommend the player to upload a play-video showing the highlight scene, i.e., a memorable play-video associated with a sense of achievement for ranking acquisition.

If the player who has received the recommendation uploads a play-video that serves as a memory, the player's affection for the game title will be enhanced accordingly. Therefore, it is expected that this will increase the possibility that the player will continue playing the game.

Meanwhile, casual players who are not placed in the ranking can readily know how superior players in the game (players who have achieved a rank) played the game by viewing play-videos associated with the ranking, which motivates the casual players to view the ranking page. By enhancing the customer attraction of the ranking page in this manner and thereby increasing the number of spectators of the ranking, it is possible to liven up the ranking in the form of game events.

Accordingly, by applying the information processing system according to this embodiment, it becomes possible to continuously and effectively motivate players executing a game to create and upload play-videos by using a ranking function. Furthermore, by associating a ranking-result dis-playing function and a play-video viewing function with each other, it becomes possible to readily provide players not placed in the ranking with the fun of participating in the game and viewing the game.

In the following description, as the method of recommending uploading of a play-video, a method of recommending a player who is likely to achieve a rank to record a play-video is adopted. However, since it suffices that a play-video be uploaded to the server 2, etc., for example, a method of automatically starting recording of a play-video and prompting (recommending) uploading of the recorded play-video may be adopted.

Figure 5:
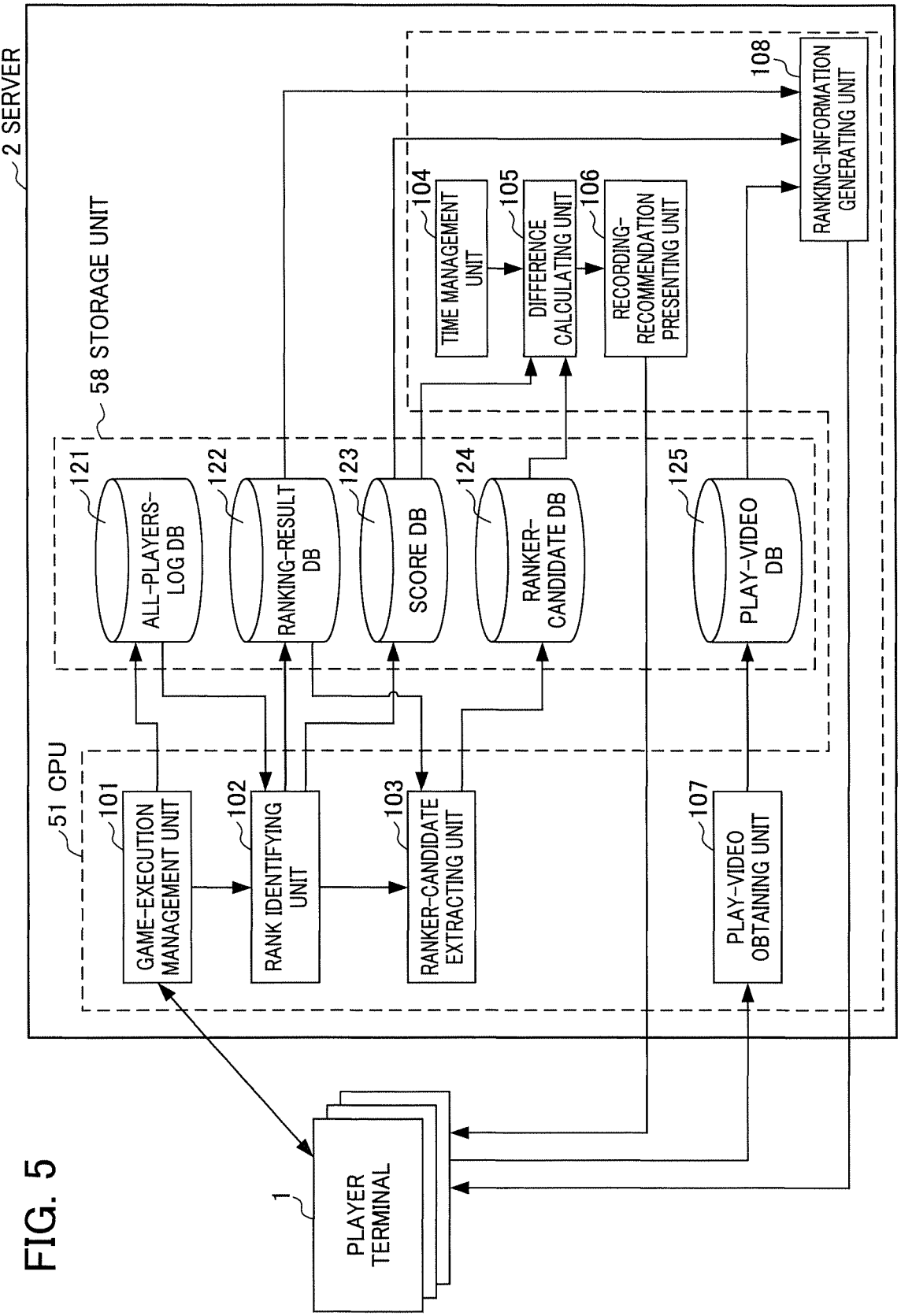
FIG. 5 is a functional block diagram showing an example functional configuration of the server in FIG. 2.

FIG. 5 is a functional block diagram showing the functional configuration of the server 2.

As shown in FIG. 5, the CPU 51 of the server 2 has the functions of a game-execution management unit 101, a rank identifying unit 102, a ranker-candidate extracting unit 103, a time management unit 104, a difference calculating unit 105, a recording-recommendation presenting unit 106, a play-video obtaining unit 107, and a ranking-information generating unit 108.

In an area of the storage unit 58 of the server 2, an all-players-log DB 121, a ranking-result DB 122, a score DB 123, a ranker-candidate DB 124, and a play-video DB 125 are provided.

The game-execution management unit 101 manages the proceedings of the game executed at the individual player terminals 1.

For example, the game-execution management unit 101 executes processing to manage the proceedings of the game that are not concluded within a player terminal 1, as in the case where a character operated by a player is attacked or healed by a character operated by another player.

The actions of individual players in the game are stored in the all-players-log DB 121 by the game-execution management unit 101 as play logs, for example, as the logs of all activities relating to rankings, including item usage histories and battle histories in the game. A specific example structure of the all-players-log DB 121 will be described later with reference to FIG. 6.

The rank identifying unit 102 refers to the all-players-log DB 121 to repeat sequentially setting each player as a player of interest, calculating a score for the player of interest, and identifying a rank on the basis of the score.

Specifically, for example, the rank identifying unit 102 extracts the play logs of the player of interest from the all-players-log DB 121 and calculates a score for the player of interest from the play logs of the player of interest according to a score aggregation method for a predetermined ranking index. The calculated score is stored in the score DB 123.

The score DB 123 stores scores for all the players.

Then, the rank identifying unit 102 identifies the rank of the player of interest on the basis of the score. The identified rank is stored in the ranking-result DB 122.

The ranking-result DB 122 is a cache database for saving intermediate calculation results in the ranking aggregation by the rank identifying unit 102.

That is, in this embodiment, since the all-players-log DB 121 becomes a large database including a large number of play logs, it is not practically feasible to execute ranking aggregation each time. Thus, intermediate results of ranking aggregation are stored in the ranking-result DB 122 at regular intervals.

When aggregating a score, the rank identifying unit 102 calculates the result of current score aggregation by extracting the last aggregation result from the ranking-result DB 122 and just adding a difference to the result of the last score aggregation.

This serves to considerably reduce the load of score aggregation.

Specifically, for example, when it is necessary to aggregate 100,000 play logs per minute, assuming that the ranking-result DB 122 is not provided and thus intermediate results are not cached, since the aggregation costs increase in proportion to time, it is necessary to aggregate 8,640,000,000 play logs at once after 24 hours.

In contrast, in this embodiment, in which the ranking-result DB 122 is provided, for example, in the case where intermediate calculation results are cached every one hour for reuse, it suffices to aggregate 360,000,000 play logs 24 times during 24 hours.

The ranker-candidate extracting unit 103 refers to the ranking-result DB 122 to extract, as ranker candidates (at the next timing for identifying ranks), players who have already achieved a rank and players having high possibilities of achieving a rank. Here, the lowest rank for achieving a rank is not particularly limited, and for example, the lowest rank is rank 5 in the example in FIG. 3.

Specifically, the ranker-candidate extracting unit 103 extracts, as ranker candidates, players at and above a rank determined by adding an arbitrary number m to the lowest rank for achieving a rank.

Since the arbitrary number m affects the load on the CPU 51 of the server 2, the arbitrary number m should preferably be a number large enough in relation to the intensity of ranking fluctuations within a range permitted by the processing ability of the CPU 51. Needless to say, the player at the highest rank (rank 1) may be excluded from ranker candidates since a further rise in the ranking cannot occur.

Information about the extracted ranker candidates is stored in the ranker-candidate DB 124.

The time management unit manages the frequency (time interval, etc.) of computation by the difference calculating unit 105, which will be described later, i.e., the frequency of calculation of the score differences between each ranker candidate and a higher-ranking player, which is necessary in order to recommend a ranker candidate having a high possibility of achieving a rank to upload a play-video.

For example, it is suitable if the time management unit 104 executes control such that the difference calculating unit 105 calculates a score difference at intervals of a few minutes in order to notify, without missing the right timing, a player who is a ranker candidate that the rank of the player is about to rise. Thus, the time management unit 104 activates the difference calculating unit 105 at regular intervals, specifically, at a frequency of once every few minutes. That is, the difference calculating unit 105 is activated at regular intervals under the management of the time management unit 104 to calculate score differences.

Here, the time management unit 104 is not a necessary element, and the difference calculating unit 105 may calculate score differences in real time. However, by providing the time management unit 104 so as to update score differences at regular intervals instead of calculating score differences in real time, as in this embodiment, it becomes possible to reduce the load imposed on the system of the server 2 in relation to the calculation of score differences.

Although not shown, the time management unit 104 may activate the rank identifying unit 102 at regular intervals as a target of time management in addition to the difference calculating unit 105.

The difference calculating unit 105 sequentially sets each ranker candidate as a player of interest and calculates the score difference between the player of interest and another player at a higher rank than the player of interest according to a ranking index.

Here, as "another player at a higher rank than the player of interest according to a ranking index", in this embodiment, another player at the rank immediately above is adopted in the case where the player of interest is a ranker candidate who has already achieved a rank, and another player at the lowest rank for achieving a rank (rank 5 in the example in FIG. 3) is adopted in the case where the player of interest is a ranker candidate who has not achieved a rank.

The recording-recommendation presenting unit 106 presents a player of interest whose score difference calculated by the difference calculating unit 105 has become less than or equal to a certain value with information recommending uploading (recording) of a play-video.

Here, the player of interest whose score difference calculated by the difference calculating unit 105 has become less than or equal to the certain value refers to a player who is about to achieve a rank if the player is a ranker candidate who has not achieved a rank and refers to a player whose rank is about to rise if the player is a ranker candidate who has already achieved a rank. Hereinafter, rank-achievement of ranker candidates who had not achieved a rank and rises in the ranks of ranker candidates who had already achieved a rank will be collectively referred to as "new rank-achievements".

Specifically, for example, the recording-recommendation presenting unit 106 executes control so as to display a dialog for permitting the start of recording of a play-video, together with a recording recommendation message, on the player terminal 1 of the player of interest whose score difference is less than or equal to the predetermined threshold.

The play-video obtaining unit 107 obtains the play-video recorded and uploaded by the player terminal 1, etc. that has received such a recommendation and stores the play-video in the play-video DB 125.

Needless to say, the play-video obtaining unit 107 also obtains play-videos voluntarily uploaded by players.

The ranking-information generating unit 108 generates ranking information to be displayed in a ranking page. Specifically, for example, the ranking-information generating unit 108 refers to the ranking-result DB 122, the score DB 123, and the play-video DB 125 to generate a ranking list in which a link or the like that enables viewing is attached to a play-video, if any is stored, for each player who has achieved a rank.

This makes it possible to motivate a large number of casual players to view the ranking page.

The rank identifying unit 102, the ranker-candidate extracting unit 103, and the recording-recommendation presenting unit 106 will be further described below in detail.

As described above, the rank identifying unit 102 repeatedly executes, individually for m kinds of ranking indices, processing for calculating the individual scores of one or more participants participating in a predetermined ranking index according to a score calculation method (score aggregation method) predefined for the predetermined ranking index and identifying the individual ranks of the one or more participants on the basis of the scores.

The scores of the individual participants calculated at this time are stored in the score DB 123.

Specifically, the score DB 123 stores the score histories of past participants individually for the m kinds of ranking indices.

Here, a method of calculating a predicted rank of a player of interest, mentioned in this paragraph, will be described specifically with reference to FIG. 6.

Specifically, the all-players-log DB 121 can be defined as a set of logs having the log structure in FIG. 6.

The log database structure (hereinafter referred to as the "log structure") shown in FIG. 6 is a data structure corresponding to a single entry in the all-players-log DB 121 (FIG. 5).

FIG. 6 shows a specific example of a single log entry in the log structure.

In the example in FIG. 6, event_type (event type), which is a character string representing the type of an event recorded in the log, is battleAttack. timestamp, which is a timestamp representing the time of occurrence of the event corresponding to the log is 2015/02/02 21:36:59:23.

Furthermore, regarding the nature of the event, the attributes of sub-structure contents are defined as follows in the form of an array of pairs of keys and values.

Specifically, character is defined as player character 1, characterAttribute is defined as water attribute, targetEnemy is defined as enemy monster 2, and damage given is defined as 2100.

Note that the attributes contained in the sub-structure contents change in accordance with the value of the event_type attribute in the log structure.

With the log structure shown in FIG. 6, an example of defining log information in the form of a flexible structure in which it is possible to identify the structure by using the event_type character string has been given above.

As a different implementation, all attributes may be listed in advance and associated with table attributes in a relational database.

When such a log structure is adopted, it is possible to implement ranking aggregation as an operation of extracting entries to be aggregated from the logs accumulated in a database (the all-players-log DB 121 in FIG. 5) in the server 2, which provides the game service.

Furthermore, intermediate aggregation results are saved in the ranking-result DB 122. This makes it possible to readily compute the latest ranks constantly by just calculating differences.

The functional configuration of the server 2 has been described above.

Next, processing executed by the server 2 having the above-described functional configuration will be described with reference to FIG. 7.

Figure 7:
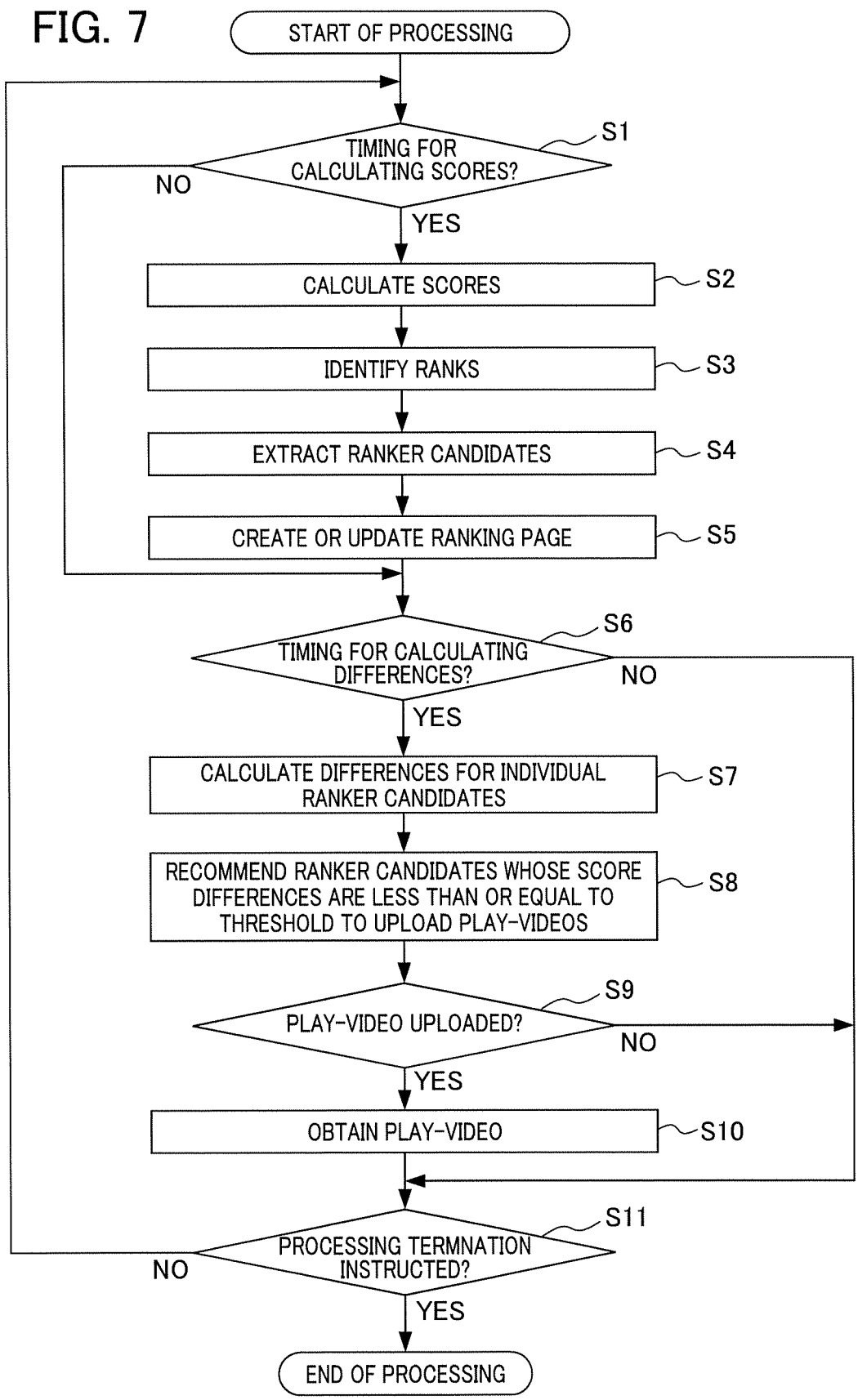
FIG. 7 is a flowchart for explaining an example of the flow of processing executed by the server having the functional configuration in FIG. 5.

FIG. 7 is a flowchart for explaining the flow of processing executed by the server 2.

The server 2, by using a predetermined timing as a trigger, executes the following series of processing steps.

In step S1, the rank identifying unit 102 determines whether or not the current timing is a timing for calculating scores.

The timings for calculating scores are not particularly limited. For example, timings at predetermined time intervals may be adopted. Here, the predetermined time intervals are timings independent of the timings for calculating differences in step 6, described later, and may be synchronized or not synchronized with the timings for calculating differences.

If the current timing is not a timing for calculating scores, the determination in step S1 results in NO, and the processing proceeds to step S6. The processing in and after step S6 will be described later.

Meanwhile, in the case where the current timing is a timing for calculating scores, the determination in step S1 results in YES, and the processing proceeds to step S2.

In step S2, the rank identifying unit 102 calculates a score for each player from play logs according to a score aggregation method for a predetermined ranking index.

In step S3, the rank identifying unit 102 identifies the ranks of all the players on the basis of the scores.

In step S4, the ranker-candidate extracting unit 103 extracts ranker candidates on the basis of the ranking results.

In step S5, the ranking-information generating unit 108 creates or updates a ranking page on the basis of the results of identification in step S3. Note that, in the case where a play-video of a player who has achieved a rank has been newly obtained in step S10, described later, the ranking-information generating unit 108 adds a link or otherwise makes it possible to view the play-video when creating or updating the ranking page.

Then, the processing proceeds to step S6.

In step S6, the time management unit 104 determines whether or not the current timing is a timing for calculating differences.

The timings for calculating differences are not particularly limited. For example, timings at predetermined time intervals may be adopted. Here, as described above, the predetermined time intervals are timings independent of the timings for calculating scores in step 1 and may be synchronized or not synchronized with the timings for calculating scores.

If the current timing is not a timing for calculating differences, the determination in step S6 results in NO, and the processing proceeds to step S10. The processing in and after step S10 will be described later.

Meanwhile, in the case where the current timing is a timing for calculating differences, the determination in step S6 results in YES, and when the difference calculating unit 105 is activated, the processing proceeds to step S7.

In step S7, the difference calculating unit 105 calculates the score differences between the individual ranker candidates and the players at ranks that are a predetermined number of ranks higher.

In step S8, the recording-recommendation presenting unit 106 recommends ranker candidates whose score differences calculated in step S7 are less than or equal to a predetermined threshold to upload play-videos. Specifically, the recording-recommendation presenting unit 106 displays a dialog for permitting the start of capturing a play-video, together with a recording recommendation message, on the screens of the player terminals 1 of those ranker candidates.

In step S9, the play-video obtaining unit 107 determines whether or not a play-video has been uploaded.

In the case where no play-video has been uploaded, the determination in step S9 results in NO, and the processing proceeds to step S11. The processing in step S11 will be described later.

Meanwhile, in the case where a play-video has been uploaded, the determination in step S9 results in YES, and the processing proceeds to step S10.

In step S10, the play-video obtaining unit 107 obtains the play-video.

Although an embodiment of the present invention has been described above, it is to be noted that the present invention is not limited to the above-described embodiment and that modifications, improvements, etc. within a scope in which it is possible to achieve the object of the present invention are encompassed in the present invention.

For example, the functional configuration in FIG. 5 is only an example, and there is no particular limitation to this example. That is, it suffices that an information processing system be provided with functions that enable the execution of the above-described series of processing steps as a whole, and the choice of functional blocks for implementing the functions is not particularly limited to the example in FIG. 5. Furthermore, the locations of the functional blocks are not particularly limited to those in FIG. 5 and may be arbitrarily set. For example, the functional blocks of the server 2 may be transferred to the player terminal 1, etc., and conversely, the functional blocks of the terminal 1, not shown in FIG. 5, may be transferred to the server 2, etc.

Furthermore, each functional block may be implemented by hardware alone, by software alone, or by a combination of hardware and software.

Specifically, for example, for the computation of score differences, it is necessary to regularly compute score differences between players whose ranks may change and players at higher ranks than those players. Thus, in the case where the difference calculating unit 105 is implemented in the server 2, as in the embodiment described above, the calculation loads of the server 2 might be high.

Figure 8:
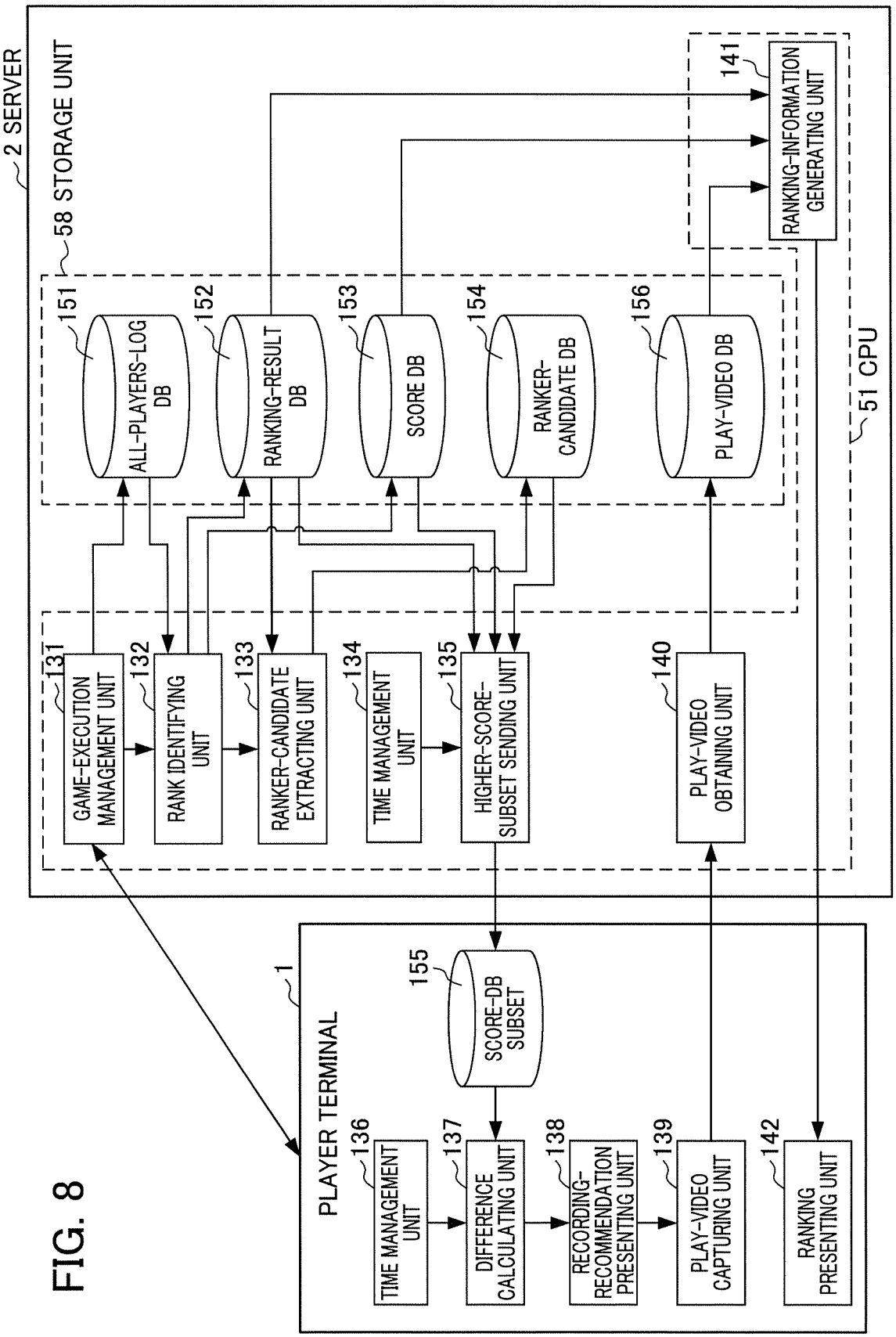
FIG. 8 is a functional block diagram showing an example functional configuration of the information processing system in FIG. 1, which is different from the example in FIG. 5.

Accordingly, it is possible to regularly send only rankings in which a relevant player may be placed to the player terminal 1 acting as a client and to calculate differences in real time on the player terminal 1 side, as shown in FIG. 8.

Specifically, FIG. 8 is a functional block diagram showing an example functional configuration of the information processing system in FIG. 1, which is different from the example in FIG. 5.

In the subsequent description, parts having the same functions as those described above and shown in FIG. 5 will be designated by the same signs or signs having the same lowest digits, and repeated descriptions will be omitted as appropriate.

As shown in FIG. 8, the CPU 51 of the server 2 has the functions of a game-execution management unit 131, a rank identifying unit 132, a ranker-candidate extracting unit 133, a time management unit 134, a higher-score-subset sending unit 135, a play-video obtaining unit 140, and a ranking-information generating unit 141.

In an area of the storage unit 58 of the server 2, an all-players-log DB 151, a ranking-result DB 152, a score DB 153, a ranker-candidate DB 154, and a play-video DB 156 are provided.

The player terminal 1 has the functions of a time management unit 136, a difference calculating unit 137, a recording-recommendation presenting unit 138, a play-video capturing unit 139, and a ranking-presenting unit 142, and a score DB subset 155 is provided in the player terminal 1.

The game-execution management unit 131, the rank identifying unit 132, the ranker-candidate extracting unit 133, the time management unit 134, the all-players-log DB 151, the ranking-result DB 152, the score DB 153, and the ranker-candidate DB 154 are configured basically the same as the game-execution management unit 101, the rank identifying unit 102, the ranker-candidate extracting unit 103, the time management unit 104, the all-players-log DB 121, the ranking-result DB 122, the score DB 123, and the ranker-candidate DB 124 in FIG. 5, and thus descriptions thereof will be omitted.

The higher-score-subset sending unit 135 refers to the ranking-result DB 152, the score DB 153, and the ranker-candidate DB 154 to generate (extract) ranking information only about a player who is a ranker candidate and players at high ranks and sends the ranking information to the player terminal 1 of that player.

The sent ranking information is stored in the score-DB subset 155 provided in the player terminal 1.

Note that, in this case, the updating of the scores of other players is not reflected in real time in the score-DB subset 155, and thus application to a game title involving intense ranking fluctuations is not suitable. Furthermore, since communications between the server 2 and the player terminal 1 acting as a client are necessary for the purpose of constant synchronization between the score DB 153 and the score-DB subset 155, there are cases where the load on the server 2 instead increases in order to support real-time ranking fluctuations with the functional configuration in FIG. 8.

In the case where the functional configuration in FIG. 8 is adopted, it is preferable to configure the client system of the player terminal 1 so that the latest score information will be newly downloaded from the server 2 to the score-DB subset 155 when the score of the player has increased at least by a certain value.

The time management unit 136 manages the frequency (time intervals, etc.) of computation of score differences by the difference calculating unit 137.

That is, the time management unit 136 differs from the time management unit 104 in FIG. 5 only in the management target and basically has the same function and configuration, and thus a description thereof will be omitted.

The difference calculating unit 137 sets the ranker candidate operating the player terminal 1 including itself as a player of interest and calculates the score difference between the player of interest and another player at a higher rank than the player of interest according to a ranking index.

Here, as "another player at a higher rank than the player of interest according to a ranking index", in this embodiment, another player at the rank immediately above is adopted in the case where the player of interest is a ranker candidate who has already achieved a rank, and another player at the lowest rank for achieving a rank (rank 5 in the example in FIG. 3) is adopted in the case where the player of interest is a ranker candidate who has not achieved a rank.

The recording-recommendation presenting unit 138 presents the player of interest with information recommending uploading (recording) of a play-video in the case where the score difference calculated by the difference calculating unit 137 has become less than or equal to a certain value.

The play-video capturing unit 139 captures a play-video at the player terminal 1. The captured play-video is sent to the server 2 at an arbitrary timing.

The play-video obtaining unit 140, the ranking-information generating unit 141, and the play-video DB 156 basically have the same functions and configurations as the play-video obtaining unit 107, the ranking-information generating unit 108, and the play-video DB 125 in FIG. 5, and thus descriptions thereof will be omitted.

As another example, although play-videos are adopted in the above-described embodiment, there is no particular limitation to play-videos, and any kind of images that represent the proceedings of the game and that can be associated with ranking information (a ranking list, etc.) may be adopted. Such images will hereinafter be referred to as "play-images". That is, play-videos are a typical example of play-images.

As another example, although ranks are computed on the basis of scores in the above-described embodiment, there is no particular limitation to the embodiment. Specifically, it suffices for the ranking computing method to be a method in which evaluation quantities for a predetermined ranking index are calculated individually for a plurality of players on the basis of the results of game execution, and individual ranks based on the ranking index are determined on the basis of the evaluation quantities. In this case, any kind of quantities may be adopted as the evaluation quantities, including scores.

In other words, an information processing system according to the present invention may be embodied in various forms configured as follows, including the above-described embodiment in FIG. 1.

Specifically, an information processing system according to the present invention is:

an information processing system including a server (e.g., the server 2 in FIG. 1) that manages the administration of a predetermined game and a plurality of terminals (e.g., the player terminals 1-1 to 1-$n$ in FIG. 1) individually operated by a plurality of players participating in the game, the server including:
- a ranking means (e.g., the rank identifying unit 102 in FIG. 5 or the rank identifying unit 132 in FIG. 8) for calculating evaluation quantities for a predetermined ranking index individually for the plurality of players on the basis of the results of execution of the game and determining individual ranks based on the ranking index on the basis of the evaluation quantities; and
- a ranking-information presenting means (e.g., the ranking-information generating unit 108 in FIG. 5 or the ranking-information generating unit 141 in FIG. 8) for presenting the plurality of terminals with ranking information showing the rank based on the ranking index and a play-image representing the proceedings of the game in association with each other for at least one of the plurality of players, and the server or the terminal of a player of interest who is to receive interest as a target of processing among the plurality of players including:
- a difference calculating means (e.g., the difference calculating unit 105 in FIG. 5 or the difference calculating unit 137 in FIG. 8) for calculating the difference in the evaluation quantities between the player of interest and another player at a higher rank than the player of interest according to the ranking index; and
- a recommending means (e.g., the recording-recommendation presenting unit 106 in FIG. 5 or the recording-recommendation presenting unit 138 in FIG. 8) for recommending the player of interest to create and upload a play-image for the ranking information in the case where the difference has become less than or equal to a certain value.

Accordingly, a technology for recommending a suitable timing for creating or uploading a play-image to a player in a system in which a ranking system and a play-image system are coordinated with each other is established.

Specifically, in existing technologies, play-videos are recorded during predetermined time units in a game, or recording is started when a record button is pressed. Thus, it is not possible to recommend "scenes to be captured now" in accordance with ranking fluctuations, which are events specific to social network games.

In contrast, the information processing system according to this embodiment enables such recommendation. That is, the case where the difference in evaluation quantities has become less than or equal to a certain value refers to the case where there is high possibility of the occurrence of a ranking fluctuation. Therefore, the information processing system according to the present invention makes it possible to automatically detect a situation in which there is high possibility that the rank of a player of interest will change and to recommend the player of interest to upload a play-image for ranking information, thereby strongly motivating the player of interest to create play-video in that situation.

Accordingly, the creator of the play-image (the player of interest) is provided with opportunities for the play-image to be viewed by many other players, and other players can be informed of superior game plays of high rankers (the player of interest, etc.).

Furthermore, the information processing system according to the present invention makes it possible to discover potential creators of play-images. That is, with the information processing system according to the present invention, it is possible utilize ranking fluctuations as chances to discover players who were not willing to capture play-images as new creators of play-images.

Since the players discovered in this manner will enhance their commitment to the game by creating new play-images, the possibility that the players will continue playing the game becomes higher.

Furthermore, the information processing system according to the present invention has superior compatibility. The function for recommending uploading (creation, etc.) of a play-image, provided in the information processing system according to the present invention, can be implemented with any SDK for recording a game video. The information processing system according to the present invention does not depend on any specific method of recording a play-video.

Furthermore, the information processing system according to the present invention has superior versatility. The function for recommending uploading (creation, etc.) of a play-image, provided in the information processing system according to the present invention, does not depend on any specific game genre and is applicable to a wide range of game genres, including action games, RPGs, shooting games, and simulation games.

Furthermore, the information processing system according to the present invention can be realized with lower operating costs than before.

Specifically, the only implementation costs are the costs of adding, to existing ranking processing, processing for calculating the difference in score between a player and another player and for comparing the difference with a threshold. Therefore, the implementation costs are extremely small.

Here, the difference calculating means may calculate the difference by considering a player whose rank based on the ranking index may change among the plurality of players as a player of interest.

By limiting the players who are recommended to upload play-images to players whose ranks based on the ranking index may change (e.g., the players placed in the top five ranks), the calculation costs needed for implementing the present invention are reduced.

Furthermore, the difference calculating means may repeatedly execute processing for calculating the difference in the evaluation quantities at predetermined time intervals.

This makes it possible to change the frequency of calculating the difference in the evaluation quantities. It is possible to provide a real-time recommendation function by increasing the frequency. It is possible to reduce the calculation costs by decreasing the frequency.

Furthermore, the difference calculating means and the recommending means may be provided at the terminal of the player of interest (see FIG. 8), the ranking means may determine ranks individually for the plurality of players in relation to each of a plurality of ranking indices, the terminal of the player of interest may further include:
a management means (e.g., the score-DB subset 155 in FIG. 8) for obtaining and managing the individual evaluation quantities for the plurality of players in relation to a ranking index according to which the player of interest is placed or may be placed at or above a predetermined rank among the plurality of ranking indices, and the difference calculating means may calculate the difference by using the evaluation quantities managed by the management means.

This makes it possible to reduce the calculation load on the server 2.

Furthermore, with the information processing system according to the present invention, it is possible to naturally record memorable play-images. The information processing system according to the present invention makes it possible to detect highlight scenes of ranking acquisition for a player of interest in advance and to record the highlight scenes as play-images, which makes it possible to save play-images associated with memories involving the satisfaction of ranking acquisition for the player of interest. Since the accumulation of play-images that serve as memories will enhance the affection of the player of interest for the game title, the possibility that the player of interest will continue playing the game may be increased.

That is, it becomes possible to motivate a large number of casual players to participate in rankings, and if the interest for the rankings themselves is enhanced, that also leads to motivating players at high ranks in a conventional overall ranking.

As described above, by adopting the information processing system according to the present invention, it is possible to produce synergy effects between rankings and play-images.

As rankings in which play-images are associated according to the present invention, it is possible to adopt rankings based on a variety of ranking indices managed by the server 2.

In this case, it becomes possible for each player to immediately obtain play-images of "superior players having a playstyle of interest to that player" and to compete with other players.

As another example, by providing an environment in which it is possible to immediately view play-images of superior players based on a variety of rankings, it is possible to produce new ways of enjoying the game; for example, superior plays of player at rank 1 in "users of character A" can be learned by players who use the same character.

In a case where the processing by each functional block is executed by software, a program constituting the software is installed on a computer, etc. via a network or from a recording medium.

The computer may be a computer embedded in special hardware. Alternatively, the computer may be a computer that can execute various functions when various programs are installed thereon, such as a server or a general-purpose smartphone or personal computer.

A recording medium including such a program is implemented by a removable medium (not shown) that is distributed separately from the main unit of the apparatus in order to provide the program to a player, a recording medium that is provided to a player in embedded form in the main unit of the apparatus, etc.

In this specification, steps dictated in the program recorded on the recording medium may include not only processing that is executed sequentially in order of time but also processing that is not executed sequentially in order of time but is executed in parallel or individually.

Furthermore, in this specification, the term "system" should be construed to mean an overall apparatus constituted of a plurality of devices, a plurality of means, etc.

REFERENCE SIGNS LIST

1, 1-1 to 1-*n* Player terminal
2 Server
51 CPU
101 Game-execution management unit
102 Rank identifying unit
103 Ranker-candidate extracting unit
104 Time management unit
105 Difference calculating unit
106 Recording-recommendation presenting unit
107 Play-video obtaining unit
108 Ranking-information generating unit
121 All-players-log DB
122 Ranking-result DB
123 Score DB
124 Ranker-candidate DB
125 Play-video DB
131 Game-execution management unit
132 Rank identifying unit
133 Ranker-candidate extracting unit
134 Time management unit
137 Difference calculating unit
138 Recording-recommendation presenting unit
139 Play-video capturing unit
140 Play-video obtaining unit
141 Ranking-information generating unit
151 All-players-log DB
152 Ranking-result DB
153 Score DB
154 Ranker-candidate DB
155 Score-DB subset
156 Play-video DB

The invention claimed is:

1. An information processing system comprising: a server that manages an administration of a game, and a plurality of terminals individually operated by a plurality of players participating in the game, wherein the server is configured to:
calculate evaluation quantities for a predetermined ranking index individually for the plurality of players based on results of execution of the game and determine individual ranks based on the predetermined ranking index and the evaluation quantities, and present the plurality of terminals with ranking information showing a rank based on the predetermined ranking index and a first play-image representing proceedings of the game for at least one of the plurality of players; and wherein the server or a terminal of a player of interest who is to receive interest as a target of processing among the plurality of players is configured to:
calculate a difference in the evaluation quantities between the player of interest and another player at a higher rank than the player of interest according to the predetermined ranking index, record, within the game, a second play-image for the ranking information in a case where the difference in the evaluation quantities has become less than or equal to a certain value, and upload, in response to presenting a recommendation to the player of interest within the game, the second play-image to the server in association with the ranking information, wherein the recommendation recommends that the player of interest upload the second play-image based on the ranking information.

2. The information processing system according to claim 1, wherein the difference is calculated between the player of interest and another player when a game match can result in a change of the player of interest within the predetermined ranking index.

3. The information processing system according to claim 1, wherein processing for calculating the difference is executed repeatedly at predetermined time intervals.

4. The information processing system according to claim 1, wherein the plurality of players are ranked individually in relation to each of a plurality of ranking indices, wherein the terminal of the player of interest is further configured to:

obtain and manage individual evaluation quantities for the plurality of players in relation to the predetermined ranking index according to which the player of interest is placed or may be placed at or above a predetermined rank among the plurality of ranking indices, and calculate the difference by using the individual evaluation quantities.

5. An information processing method executed by a server that manages an administration of a game and at least one of a plurality of terminals individually operated by a plurality of players participating in the game, the information processing method comprising:

calculating, by the server, evaluation quantities for a predetermined ranking index individually for the plurality of players based on results of execution of the game and determine individual ranks based on the predetermined ranking index and the evaluation quantities, and presenting, by the server, the plurality of terminals with ranking information showing a rank based on the predetermined ranking index and a first play-image representing proceedings of the game for at least one of the plurality of players; and wherein the information processing method further comprises, executing by the server or a terminal of a player of interest who is to receive interest as a target of processing among the plurality of players:

calculating a difference in the evaluation quantities between the player of interest and another player at a higher rank than the player of interest according to the predetermined ranking index, recording, within the game, a second play-image for the ranking information in a case where the difference in the evaluation quantities has become less than or equal to a certain value, and uploading, in response to presenting a recommendation to the player of interest within the game, the second play-image to the server in association with the ranking information, wherein the recommendation recommends that the player of interest upload the second play-image based on the ranking information.

6. A non-transitory computer readable medium storing a program executed by computers that control a server that manages an administration of a game and at least one of a plurality of terminals individually operated by a plurality of players participating in the game, wherein the program causing a computer that controls the server to execute control processing comprises functionality for:

calculating evaluation quantities for a predetermined ranking index individually for the plurality of players based on results of execution of the game, and determining individual ranks based on the predetermined ranking index and the evaluation quantities, and presenting the plurality of terminals with ranking information showing a rank based on the predetermined ranking index and a first play-image representing proceedings of the game for at least one of the plurality of players; and wherein the program causing the computer that controls the server or a computer that controls the terminal of a player of interest who is to receive interest as a target of processing among the plurality of players to execute control processing comprises functionality for:

calculating a difference in the evaluation quantities between the player of interest and another player at a higher rank than the player of interest according to the predetermined ranking index;

recording, within the game, a second play-image for the ranking information in a case where the difference in the evaluation quantities has become less than or equal to a certain value; and uploading, in response to presenting a recommendation to the player of interest within the game, the second play-image to the server in association with the ranking information, wherein the recommendation recommends that the player of interest upload the second play-image based on the ranking information.

7. A server that manages an administration of a game by carrying out communications individually with a plurality of terminals individually operated by a plurality of players participating in the game, wherein the server is configured to:

calculate evaluation quantities for a predetermined ranking index individually for the plurality of players based on results of execution of the game and determine individual ranks based on the predetermined ranking index and the evaluation quantities;

present the plurality of terminals with ranking information showing a rank based on the predetermined ranking index and a first play-image representing proceedings of the game for at least one of the plurality of players;

calculate a difference in the evaluation quantities between the player of interest and another player at a higher rank than the player of interest according to the predetermined ranking index;

record, within the game, a second play-image for the ranking information in a case where the difference in the evaluation quantities has become less than or equal to a certain value; and upload, in response to presenting a recommendation to the player of interest within the game, the second play-image to the server in association with the ranking information, wherein the recommendation recommends that the player of interest upload the second play-image based on the ranking information.

8. An information processing terminal of a player of interest who is to receive interest as a target of processing among a plurality of players participating in a game in an information processing system including a server that manages an administration of the game and a plurality of information processing terminals individually operated by the plurality of players, wherein the server is configured to:
  calculate evaluation quantities for a predetermined ranking index individually for the plurality of players based on results of execution of the game and determine individual ranks based on the predetermined ranking index and the evaluation quantities, and
  present the plurality of information processing terminals with ranking information showing the rank based on the predetermined ranking index and a first play-image representing proceedings of the game in association with each other for at least one of the plurality of players;

wherein the information processing terminal is configured to:
  calculate a difference in the evaluation quantities between a player of interest who is to receive interest as a target of processing among the plurality of players and another player at a higher rank than the player of interest according to the predetermined ranking index,
  record, within the game, a second play-image for the ranking information in a case where the difference in the evaluation quantities has become less than or equal to a certain value, and
  upload, in response to presenting a recommendation to the player of interest within the game, the second play-image to the server in association with the ranking information, wherein the recommendation recommends that the player of interest upload the second play-image based on the ranking information.

* * * * *